May 3, 1938.  R. P. DUNMIRE  2,116,344
PURIFICATION OF OIL
Filed March 30, 1935  2 Sheets-Sheet 2

INVENTOR
Russell P. Dunmire
by
Byrnes, Stebbins & Blenko
His Attys.

Patented May 3, 1938

2,116,344

UNITED STATES PATENT OFFICE 2,116,344

PURIFICATION OF OIL

Russell P. Dunmire, Alliance, Ohio, assignor, by mesne assignments, to The Buckeye Laboratories, Inc., Alliance, Ohio, a corporation of Ohio Application March 30, 1935, Serial No. 13,893

7 Claims. (Cl. 196—16)

This invention relates to the purification of oil, and more particularly to a process of reclaiming hydrocarbon oils, such as cable, transformer and switch oils. The process not only removes solids in colloidal suspension, but also dehydrates, degasifies, demulsifies and decolorizes the oil, rendering it suitable for re-use.

In the accompanying drawings, which illustrate two embodiments of my invention,

Describing the preferred process generally, the impure or dirty oil is passed through a primary filter to remove solids and is then heated and introduced under pressure into a combined degasifier and mixer. The oil is atomized or sprayed in fine particle form into the degasifier which is maintained under high vacuum, thereby causing the release of moisture and gases from the oil. The moisture and gases are withdrawn from the vacuum chamber by a vacuum pump connected to the chamber. The degasified oil is then collected and passed in film form over baffles within the chamber and is delivered to a mixing chamber which is in communication with the degasifier chamber and which also is maintained under a high vacuum. During the time that the oil is being sprayed into the vacuum chamber, an adsorbent material is supplied to the oil. The adsorbent material is also maintained under vacuum while it is being supplied to the oil in a loose, finely divided state, thereby dehydrating it and materially reducing the foam which would be produced otherwise if the adsorbent material was added directly to the oil without dehydrating it. When the adsorbent material is added to the oil, gases are liberated from the adsorbent material and from the oil. In the present invention, the vacuum is applied simultaneously with the introduction of the adsorbent material in loose, finely divided condition into the oil so that the gases are acted upon immediately upon their liberation and withdrawn from the vacuum chamber.

The degasified oil and adsorbent material are then passed to a filter which removes the adsorbent material with its adsorbed impurities. This filter is preferably of the rotary cake type. The oil is then passed to a blotter type filter which removes any solids which may still remain in the oil, after which the oil is passed to a secondary degasifier. The oil is sprayed or atomized into fine particles in the secondary degasifier which is maintained under reduced pressure so as to liberate any gases or moisture which may still remain in the oil. The oil is then passed to a storage tank which is maintained under reduced pressure and regulated temperature until such time as it is desired to use it.

Figure 1:
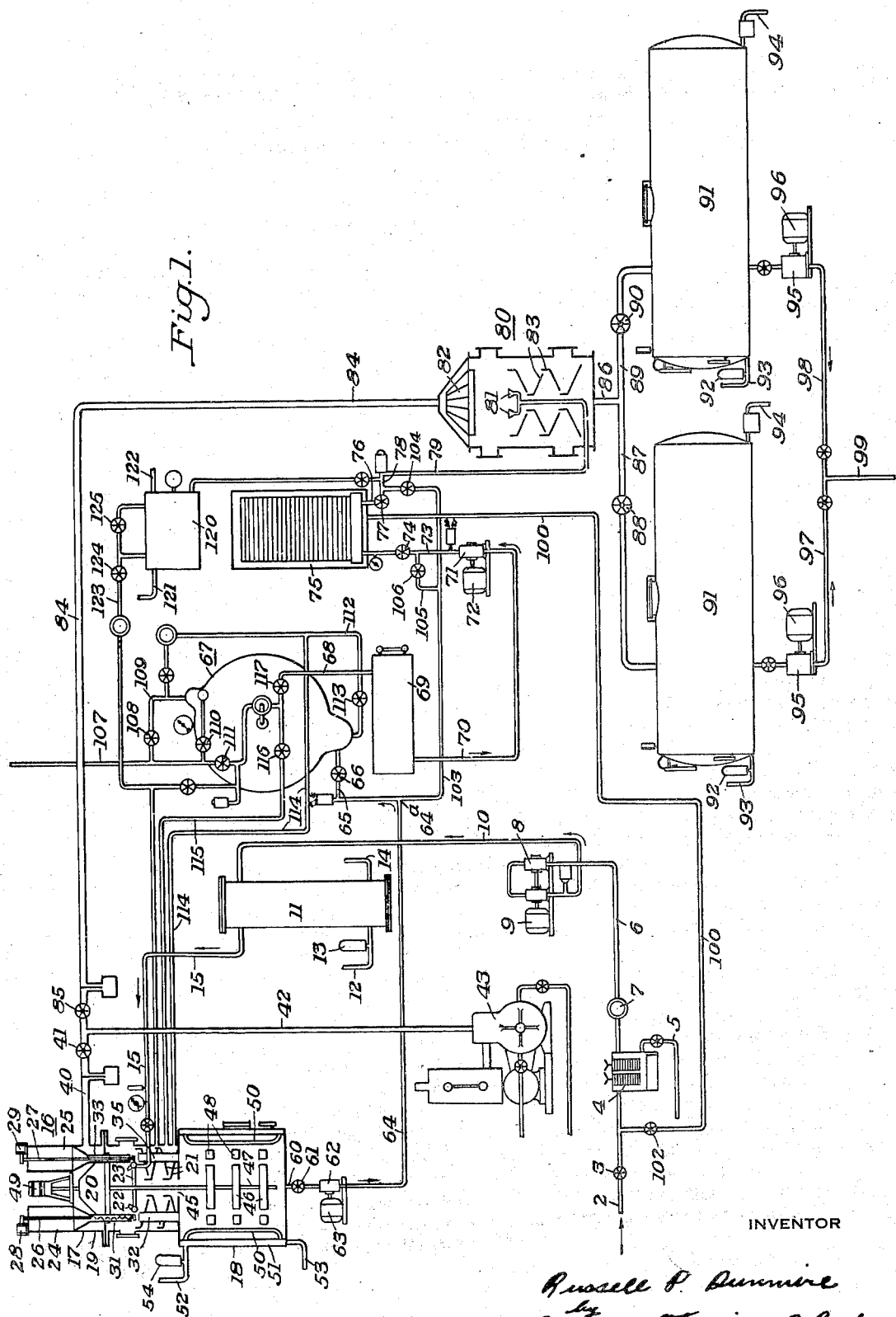
Figure 1 is a general lay-out view showing the complete apparatus.

Referring more particularly to the accompanying drawings, and for the present to Figure 1, the impure or dirty oil is admitted through a pipe 2 provided with a valve 3. It flows through a primary filter 4 provided with a drain 5 and then through pipe 6 provided with a sight gauge 7 to a high pressure pump 8 driven by a motor 9. The oil is then passed through a pipe 10 to a heater 11. The heater is heated by steam admitted through an inlet 12, the heater being provided with a temperature regulator 13. The steam exits through a pipe 14. The steam heats the oil by indirect means rather than direct contact therewith, the temperature of the oil being raised in the heater preferably to 140–275° F. The heated oil is then passed through a pipe 15 to a degasifier and mixer indicated generally by the reference numeral 16.

The oil delivered through pipe 15 is preferably under a pressure of 100 to 250 pounds per square inch and the vacuum maintained in the degasifier is preferably from 28.5 to substantially 30 inches of mercury as referred to a 30 inch barometer.

The combined degasifier and mixer consists of two sections 17 and 18 which are, respectively, the degasifying section and the mixer section. The degasifier section 17 comprises a casing 19 in which is provided a hood-shaped baffle 20. Below the baffle 20 are other baffles 21 so arranged as to cause the oil which falls down from the baffle 20 onto the baffles 21 to follow a tortuous path to the bottom of the degasifier section. Also located inside of the casing are spray nozzles 22 connected together by a pipe 23 and also connected to the pipe 15. Mounted on the top of the section 17 are two hoppers 24 and 25. These hoppers are provided, respectively, with feeding devices 26 and 27, which are operated by motors 28 and 29. Adsorbent material contained in the hopper 24 is fed by the feeding device 26 through an extension 31 of the hopper into a tube 32. This tube is open at the bottom so that the adsorbent material is fed into the oil which collects in the mixing section 18. The adsorbent material is preferably a mixture of fuller's earth, activated carbon and a silicious material to act as a filter aid, preferably that sold under the trade name "Hyflo Super-Cel" in the proportions preferably of one-half to one and one-half percent of a mixture of fuller's earth and activated carbon and from one-tenth to one-half percent of the silicious material.

The feeding device 27 feeds a precoating material contained in the hopper 25 through an extension 33 into and through a tube 35 to the oil in the mixer section 18. It will be understood that the precoating material is for the purpose of forming a filtering surface on the filters which are referred to hereinafter, and that after the filtering surfaces have been prepared, the precoating material is no longer fed to the oil in the section 18 from hopper 25.

The oil which is fed to the degasifier section 17 under high pressure is atomized or sprayed by the nozzles 22 so as to break it up into very fine particles. Since the degasifier section is maintained under high vacuum, the particles of oil are subjected to a sudden pressure drop or shock which releases moisture and gases from the oil particles. The moisture and gases so released are withdrawn from the degasifier through pipe 40 provided with valve 41 and pipe 42 which is connected to a vacuum pump 43.

The oil which has flowed in film form over the baffles 21 while exposed to the vacuum then flows through an opening 45 into the mixer section 18 and the adsorbent material discharged from the lower end of the tube 32 is here mixed with the degasified oil. The oil and adsorbent material are agitated by a rotatable stirrer consisting of paddles 46 mounted on a vertical shaft 47. Adjacent to the paddles 46 are stationary baffles 48 which aid in the thorough mixing of the adsorbent material and oil. The shaft 47 extends upwardly through the opening 45 and through the degasifier section 17 and is connected at its upper end to a motor 49 by means of which it is rotated. The mixture section 18 is heated by means of steam pipes 50 within the casing 51 of the mixer. Steam is admitted to the pipes 50 through a pipe 52 and exits therefrom through a pipe 53. A temperature regulator 54 is provided for maintaining the proper temperature in the mixer. It is preferred to maintain the mixture of oil and adsorbent material at a temperature between 250° F. and 600° F. This high temperature treatment without deterioration of the oil is possible due to the previous spraying or atomizing of the oil into the degasifier section 17 which removes the greater part of the impurities. Heating the oil at this stage of the process permits the rapid removal of any gases or moisture remaining in the oil, which gases or moisture may have been present in the impure oil or which may have been introduced into the oil due to the addition of the adsorbent material. It will be noted, however, that the adsorbent material is in a loose, finely divided state and under vacuum during its passage from the hopper 24 to the oil in the mixer section 18, and thus the greater portion of any moisture or gases originally present in the adsorbent material are removed before the adsorbent material contacts with the oil. This materially reduces the tendency of the mixture of oil and adsorbent material to foam.

The oil flows out of the mixer section 18 through a pipe 60 controlled by a valve 61 and is pumped by a pump 62 connected to a motor 63 through pipe 64 and pipe 65 provided with a valve 66 to a filter 67 which preferably is of the rotary cake type. The filter removes the adsorbent material and the clear oil then passes through a pipe 68 to a surge tank 69 and from the surge tank through a pipe 70 to a pump 71 connected to a motor 72, which pump delivers the oil through pipe 73 provided with a valve 74 to a secondary filter 75. The secondary filter is provided so that in the event that the cake in the rotary cake filter breaks, the secondary filter will be effective for removing any solid material passing through the rotary filter.

The oil is passed from the filter 75 through pipe 76 provided with a valve 77 and pipes 78 and 79 to a secondary degasifier indicated generally by the reference numeral 80. The pipe 79 delivers the oil under pressure, preferably from 10 to 50 pounds per square inch, to spray or atomizing nozzles 81 located within the secondary degasifier 80. Located within the secondary degasifier are baffles 82 adjacent the top of the degasifier and other baffles 83 which collect the oil dripping from the baffles 82 and cause it to follow a tortuous path to the bottom of the degasifier. The secondary degasifier 80 is connected at its top by a pipe 84 provided with a valve 85 to the pipe 42 leading to the vacuum pump 43. In this manner the secondary degasifier 80 is maintained under reduced pressure, the vacuum in the degasifier preferably being from 28.5 to substantially 30 inches of mercury as referred to a 30 inch barometer. The secondary degasifier 80 operates in substantially the same manner as the primary degasifier 17. In both degasifiers the oil is introduced into the vacuum chamber under pressure and the vacuum chamber is maintained under a high vacuum so as to thereby subject the oil to a sudden shock which causes liberation of any gases and moisture contained in the atomized oil.

The oil is delivered from the bottom of the secondary degasifier 80 through a pipe 86 and either through pipe 87 provided with a valve 88 or pipe 89 provided with a valve 90 to one of the storage tanks 91. The oil is stored under vacuum in these tanks until ready for use. The vacuum is maintained in the storage tanks 91 due to the connections of either the pipe 87 or the pipe 89 with the secondary degasifier 80. The oil in the tanks 91 is maintained at approximately the temperature of the atmosphere surrounding the tanks so as to prevent condensation of moisture which might be absorbed by the oil and thereby decrease its insulation value. The temperature of the oil in the storage tanks is regulated by temperature regulators 92 which control the admission of steam through steam pipes 93. The steam exits through pipes 94. An oil pump 95 connected to a motor 96 is provided for withdrawing the oil from each of the tanks 91 and delivering the oil through pipes 97 or 98 to an outlet pipe 99.

A drain pipe 100 provided with valve 102 connects the sump of the secondary filter 75 with the inlet pipe 2 so that the seepage from the secondary filter may be returned for recirculation through the system.

Provision is made for bypassing the oil from the degasifier 16 around the filters 67 and 75 when the process is operated, as in some instances, without mixing adsorbent material with the oil. For this purpose a pipe 103 is connected to the pipe 64, as indicated at 64a. The other end of pipe 103 is connected to pipe 78 leading from the secondary filter 75 to the secondary degasifier 80. The pipe 103 is provided with valve 104. A bypass pipe 105 provided with a valve 106 connects the pipes 73 and 103 so that the oil may be passed through the secondary filter 75 and secondary degasifier 80 without passing through the rotary cake filter 67.

The rotary filter 67 has a pipe 107 connected thereto through which compressed air may be introduced for thoroughly drying and discharging the filter cake after completion of the filtration cycle so as to recover virtually all of the oil which would normally be entrained in the filter cake and return the oil to the mixer. The air from pipe 107 passes through valve 108 in pipe 109 to the filter 67, valves 110 and 111 being closed at this time. The oil is discharged from the filter 67 through pipe 112 provided with valve 113, and pipe 114 which returns it to the degasifier 16. After the filter 67 is empty and the cake has been blown dry by the compressed air, the direction of flow of the air is reversed so as to blow off the cakes from the filter leaves. This is accomplished by closing valve 108 and opening valves 110 and 111. The cake is then removed by means of a screw conveyor. The filter leaves are thereafter again precoated. In the precoating operation, the oil and precoating material are delivered to the filter 67 by pipe 65. The oil exits from the filter through pipe 115 provided with valve 116, valve 117 in pipe 68 being closed at this time. After the precoating operation, the flow through the system is as previously described.

A blotter drier 120 is also provided for the purpose of drying and impregnating the blotters with oil before they are placed in the secondary filter 75 in those cases where the secondary filter is of the blotter type. The drier is heated by steam which enters through pipe 121 and exits through pipe 122. The drier is connected by pipe 123 to the degasifier 16 so that vacuum may be applied to the drier. The pipe 123 is provided with valves 124 and 125. In operation of the drier, the blotters are subjected to vacuum by opening valve 124 in pipe 123, valve 126 leading to the rotary cake filter 67 being closed. Thereafter, oil is drawn through the blotters in the drier by opening valve 127 in pipe 128 which connects the outlet of secondary filter 75 with the drier 120. The oil, after passing through the blotters in the drier, flows through pipe 123 and pipe 129 to the rotary filter 67.

Figure 2:
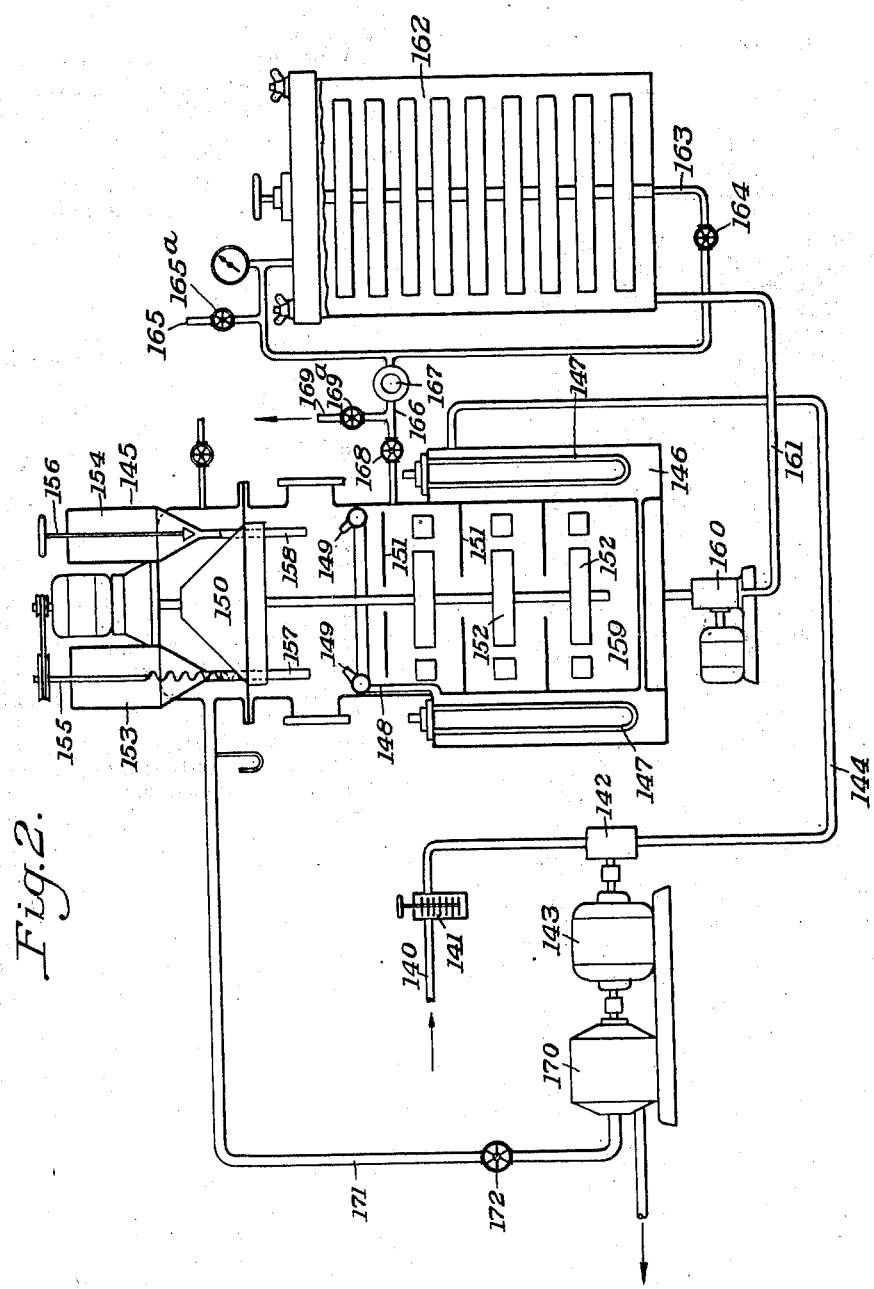
Figure 2 is a similar view illustrating a slightly modified form of the invention.

The embodiment illustrated in Figure 2 is generally similar to that already described. Referring to Figure 2, the impure oil is admitted through a pipe 140 and after passing through a primary filter 141, it is pumped by a pump 142 connected to a motor 143 through pipe 144 to the degasifier and mixer indicated generally by the reference numeral 145. The oil from pipe 144 passes through a heating compartment 146 provided with electric heaters 147 and then passes through a pipe 148 to nozzles 149. The degasifier and mixer is provided with baffles 150 and 151 and with an agitator 152 and hoppers 153 and 154 and feed devices 155 and 156 generally similar to those described in connection with Figure 1.

The adsorbent material and the precoating material are discharged from the lower ends of the extensions 157 and 158 of the hoppers by the feed devices 155 and 156.

The extensions 157 and 158 of the hoppers 153 and 154 are so located with respect to the nozzles 149 that the adsorbent material and precoating material, as they fall through space in the degasifier, come in contact with the oil sprayed from the nozzles so that the mixture of the adsorbent material and oil takes place while the oil is still in dispersed condition and before it has collected in a body in the mixing chamber 159. In this manner, very intimate contact is obtained between the adsorbent material and the finely dispersed particles of oil. This intimate contact increases the efficiency of the adsorbent material beyond that obtained when the adsorbent material is added to a body of oil which is not in finely dispersed particle form.

The degasifier oil having the adsorbent material mixed therewith is then pumped by a pump 160 through pipe 161 to a filter 162 and the oil is withdrawn from the filter through a pipe 163 provided with valve 164. Pipe 163 is connected to a pipe 166 which leads to the degasifier chamber 145, a lock box 167 and valve 168 being provided in the pipe 166. A vent pipe 165 provided with valve 165a is connected to the upper end of pipe 163. The filtered oil is delivered through pipe 169 provided with valve 169a. During the precoating of the filter 162, the valve 168 is open and the valve 169a closed so as to return the filtrate to the degasifier 145. After the filter has been precoated, valve 168 is closed and valve 169a is opened so as to deliver the filtrate through pipe 169.

The degasifier 145 is maintained under reduced pressure by a vacuum pump 170 driven by the motor 143 and connected to the degasifier by a pipe 171 provided with valve 172. The temperature, pressure and degree of vacuum employed in the apparatus illustrated in Figure 2 are preferably the same as those given in connection with the apparatus illustrated in Figure 1.

In each embodiment the adsorbent material is subjected to vacuum while in a loose, finely divided state simultaneously with its admixture with the oil, thereby greatly decreasing the foaming which occurs when the adsorbent material is added in the usual manner and not under reduced pressure. In each case the mixture of adsorbent material and oil is heated while under vacuum, thereby increasing the ease with which any moisture or gases in the oil or in the adsorbent material may be liberated therefrom by the reduced pressure to which they are subjected. The adsorbent material is thoroughly mixed with the oil by agitating the mixture in a tank which is maintained under the desired temperature, thereby insuring thorough contact of the adsorbent material with the oil.

By the term "high vacuum" is meant from 28.5" to 30" absolute as referred to a 30" barometer at sea level. By the term "high pressure" is meant from 50 to 250 lbs. gauge per sq. in. By the term "an evacuated adsorbent" is meant an adsorbent which has been subjected to a relatively high vacuum, for example from 28.5" to 30" absolute as referred to a 30" barometer at sea level. Such treatment renders the adsorbent material anhydrous so that its adsorbent qualities are greatly increased by virtue of the fact that it is able to adsorb petroleum compounds into the capillaries which were formerly occupied by water.

I have illustrated and described two embodiments of my invention and have described the preferred conditions under which the process is carried out. It is to be understood, however, that the invention may be otherwise embodied or practiced within the scope of the following claims.

I claim:

1. The method of purifying oil, which comprises spraying oil in fine particles under pressure into an atmosphere maintained under high vacuum to release moisture and gases therefrom, supplying adsorbent material to the oil while the oil is in dispersed condition, and filtering out the adsorbent material.

2. The method of purifying oil, which comprises spraying oil in fine particles under high pressure into an atmosphere maintained under high vacuum to release moisture and gases therefrom, supplying adsorbent material to the oil while the oil is in dispersed condition, heating the mixture of adsorbent material and oil at a temperature between 250 and 600° F., and filtering out the adsorbent material.

3. The method of purifying oil, which comprises spraying oil in fine particles under pressure into an atmosphere maintained under high vacuum to release moisture and gases therefrom, supplying adsorbent material to the oil while the oil is in dispersed condition and while both the adsorbent material and oil are subjected to high vacuum, and filtering out the adsorbent material.

4. Apparatus for purifying oil, comprising a heater, a degasifier, means for maintaining the degasifier under high vacuum, a mixer in communication with said degasifier, means for passing the oil through said heater and spraying it in fine particles under high pressure into said degasifier, means for supplying adsorbent material to the oil in said mixer, means for heating said mixer, a filter communicating with said mixer, a second degasifier, and means for passing oil from said mixer through said filter to said second degasifier.

5. Apparatus for purifying oil, comprising a heater, a degasifier, means for maintaining the degasifier under high vacuum, a mixer in communication with said degasifier, means for passing the oil through said heater and spraying it in fine particles under high pressure into said degasifier, means for supplying adsorbent material to the oil in said mixer, means for heating said mixer, a filter communicating with said mixer, a second degasifier, means for maintaining said second degasifier under vacuum, means for passing oil from said mixer through said filter to said second degasifier, a storage tank in communication with said second degasifier, and means for maintaining said storage tank under vacuum.

6. Apparatus for purifying oil, comprising a heater, a unitary structure providing a degasifier chamber and a mixing chamber in communication with each other, the degasifier chamber being above the mixing chamber, means for passing the oil through said heater and spraying it in fine particles under high pressure into said degasifier, means for maintaining the degasifier chamber under high vacuum, a hopper for adsorbent material, means in the degasifier chamber and in communication with the vacuum therein for feeding adsorbent material from the hopper to the mixing chamber, means for heating said mixer, a filter communicating with said mixer, a second degasifier, and means for passing oil from said mixer through said filter to said second degasifier.

7. Apparatus for purifying oil, comprising a degasifier chamber and a mixing chamber in communication with each other, means for spraying oil in fine particles under high pressure into said degasifier chamber, means for maintaining said degasifier chamber under high vacuum, means for supplying adsorbent material to the oil while the oil is in dispersed condition, and means in said mixing chamber for mixing the oil and adsorbent material.

RUSSELL P. DUNMIRE.